United States Patent
Patil et al.

(10) Patent No.: US 9,095,917 B2
(45) Date of Patent: Aug. 4, 2015

(54) DIE HEAD RETAINING MECHANISM

(71) Applicant: Emerson Electric Co., St. Louis, MO (US)

(72) Inventors: Prasad Chatursingh Patil, Maharashtra (IN); Sachin Shashikant Dakare, Maharashtra (IN); Richard M. Kundracik, Elyria, OH (US)

(73) Assignee: EMERSON ELECTRIC CO., St. Louis, MO (US)

( * ) Notice: Subject to any disclaimer, the term of this patent is extended or adjusted under 35 U.S.C. 154(b) by 500 days.

(21) Appl. No.: 13/651,737

(22) Filed: Oct. 15, 2012

(65) Prior Publication Data

US 2014/0037394 A1 Feb. 6, 2014

(51) Int. Cl.
| | |
|---|---|
| *B23G 5/04* | (2006.01) |
| *B23G 1/04* | (2006.01) |
| *B23G 1/24* | (2006.01) |
| *B23G 1/46* | (2006.01) |
| *B23B 31/163* | (2006.01) |

(52) U.S. Cl.
CPC .. *B23G 1/04* (2013.01); *B23G 1/24* (2013.01); *B23G 1/46* (2013.01); *B23B 31/16004* (2013.01); *B23G 2240/44* (2013.01); *Y10T 408/95* (2015.01); *Y10T 408/953* (2015.01)

(58) Field of Classification Search
CPC .............. Y10T 408/95; Y10T 408/953; B23G 2240/44; B23G 5/04; B23G 1/22; B23G 1/24; B23G 1/52
USPC ............... 408/240, 239 R; 470/207, 114–116
See application file for complete search history.

(56) References Cited

U.S. PATENT DOCUMENTS

| | | | | |
|---|---|---|---|---|
| 127,257 | A | * | 5/1872 | Meyer ........................ 408/174 |
| 166,716 | A | * | 8/1875 | Nugent ....................... 408/174 |
| 293,868 | A | * | 2/1884 | Hargrave ..................... 408/174 |

(Continued)

FOREIGN PATENT DOCUMENTS

| | | |
|---|---|---|
| CN | 101704141 | 5/2010 |
| CN | 201644960 | 11/2010 |

(Continued)

OTHER PUBLICATIONS

International Search Report (ISR) and Written Opinion, PCT/US2013/050500, Nov. 11, 2013 (13 pages).

*Primary Examiner* — Sunil K Singh
*Assistant Examiner* — Ryan Rufo
(74) *Attorney, Agent, or Firm* — Mark E. Bandy; Rankin, Hill & Clark LLP

(57) ABSTRACT

A die head retaining mechanism for installing or removing a die head in a power drive for thread cutting operations is described. The mechanism comprises a cam and follower arrangement with a face gear having at least one locking jaw disposed in a slot provided on the face of the face gear oriented away from the housing. The mechanism also comprises a drive ring having a collection of cam profiles to control the movement of the locking jaws. The mechanism also comprises at least one compression spring disposed in corresponding groove(s) on the face gear. The compression spring is typically preloaded to keep the locking jaws in a locked position. The mechanism also comprises a bearing provided between the housing and the face gear. The bearing is locked in place by a retaining ring. A locking plate, spring washers, and screws are used to secure the assembly of the die head retaining mechanism on the power drive.

8 Claims, 8 Drawing Sheets

(56) References Cited

U.S. PATENT DOCUMENTS

| | | | |
|---|---|---|---|
| 317,022 A * | 5/1885 | Saunders | 408/177 |
| 1,289,721 A * | 12/1918 | Fisher | 408/176 |
| 2,205,148 A | 6/1940 | Mayote | |
| 2,718,646 A * | 9/1955 | McKenzie | 470/209 |
| 2,739,322 A | 3/1956 | Reimschissel et al. | |
| 2,958,877 A | 11/1960 | Strickland | |
| 3,521,313 A | 7/1970 | Baker | |
| 4,502,821 A * | 3/1985 | Wagner | 408/124 |
| 5,203,874 A | 4/1993 | Azkona-Ollacarizqueta | |
| 5,375,309 A | 12/1994 | Dunn | |
| 5,819,607 A | 10/1998 | Carnesi | |
| 2005/0276671 A1 * | 12/2005 | Grove et al. | 408/158 |
| 2011/0031707 A1 | 2/2011 | Chen | |

FOREIGN PATENT DOCUMENTS

| | | |
|---|---|---|
| DE | 4231975 | 4/1993 |
| GB | 547309 | 8/1942 |

* cited by examiner

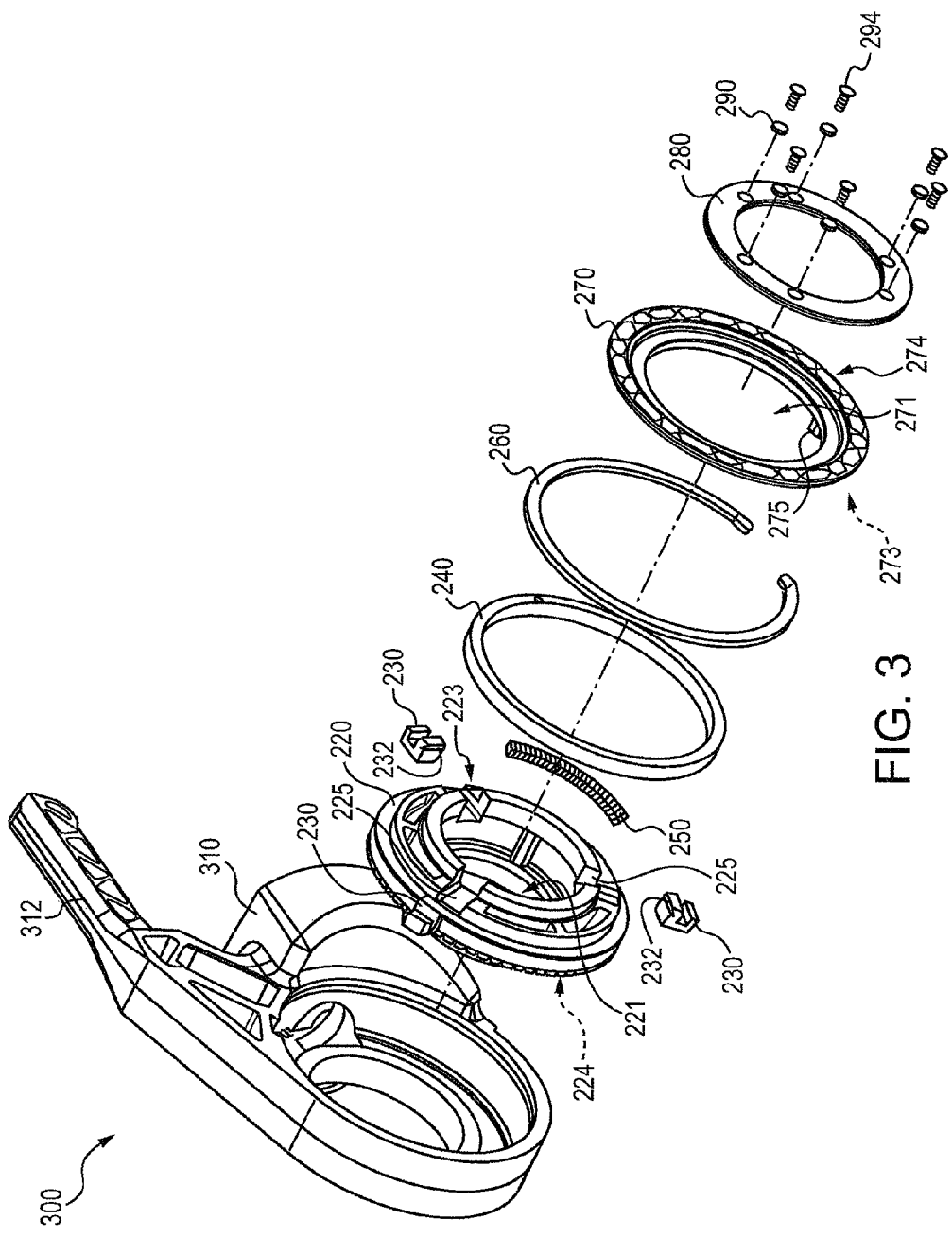

DIE HEAD RETAINING MECHANISM

CROSS REFERENCE TO RELATED APPLICATIONS

This application claims priority upon Indian patent application Serial No. 2248/MUM/2012 filed on Aug. 6, 2012.

FIELD

The present subject matter relates to thread cutting mechanisms. In particular, the present subject matter relates to a mechanism for locking a die head in a thread cutting machine, such as a power drive, a threading machine, a screw machine and the like. More particularly, the present subject matter relates to thread cutting operations in which axial locking of a die head is required.

The present subject matter also relates to other fields, in which a die head and such other locking mechanisms are used, e.g. in electric motors, compressors, valves, regulators, gearboxes and any other similar products or models.

BACKGROUND

Threads are used on a wide array of mechanical components, piping, and conduit for engaging components together and/or to provide a sealing connection between components. Numerous thread sizes and thread configurations are known, such as tapered threads and non-tapered or "straight" threads. Within each class, a variety of different thread forms have been developed and used depending upon the application, type of work piece, customs of the locale, and preferences of the user.

Devices for forming threads on pipe ends are well known in the art. Such devices use one or more dies that form a helical thread extending from one region of the pipe to another region. The die is orbited about the axis of the pipe and/or the pipe is rotated while the die is engaged with a select region of the pipe to form the thread.

When assembling piping systems or when forming custom piping layouts, sections of pipe are typically cut and threaded at a construction or assembly site. As a result, portable or semi-portable pipe threading devices have been developed which can be used at the job site to prepare threaded pipe ends.

Presently, hand held power drive units are known which provide power to die heads during thread cutting operations on pipes. This power is provided by the power drive with angular velocity and torque dependent upon the type of thread, dies, and pipe. In such an operation, the die head needs to be retained in an axial direction to prevent disengagement with the power drive spindle. Particularly, force must be applied to the die head in the axial direction during the initial engagement of the die head with the pipe. In a present configuration of such power drives, a spring ring is used to lock the die head, which necessitates a higher effort for installing or removing the die head in the assembly. Moreover, for locking the axial movement of the die head in such assembly, the spring ring must be snap fitted in a groove on a face gear in order to provide locking of the die head. Thus, an exceedingly high force is required to fully engage the die head in the face gear with the spring ring, thus resulting in a cumbersome and time consuming operation. Furthermore, with continued use, this spring ring loses its stiffness and locking force so that replacement may be required.

Other power drive units either use an internally threaded disc for axial locking of the die head or use a retaining ring to lock the die head. As a consequence, greater time is required for installing or removing the die head. The retaining ring is inserted behind the die head (after installation of the die head in the power drive) in an available groove. Therefore, an external device (e.g. a screw driver) is necessary for installing or removing the die head.

The following descriptions represent the state of the art relating to die head retaining mechanisms in pipe cutting or threading machines.

CN 101704141 discloses an electric pipe cutting threading machine, aiming at overcoming the problems of narrow application range and low machining accuracy of common threading machines. The electric pipe cutting threading machine comprises an automatic cutter-withdrawal device, a die head, a scraper and a cutting knife. The machine is characterized in that the die head comprises a baffle, a locking screw, a release lever, a transmission screw pressure spring, a transmission screw, a fastening card, a curve locking disk which is arranged between a curve disk and a salver, and a locking hole which is cut on the curve disk. Further, a moon-groove is arranged on a die-disk, and the transmission screw pressure spring and the transmission screw are arranged in this moon-groove. A transmission hole is arranged on the curve locking disk, which is penetrated by the transmission screw. The baffle is shaped in an 'L' shape which is reversed vertically and articulated on the curve locking disk. The curve locking disk is provided with a blocking handle and a limiting lug. The release lever is articulated on the die-disk. The automatic cutter-withdrawal device comprises a sine block, a guiding rod, a left pressure spring and a right pressure spring, wherein the sine block is sheathed on the guiding rod and the left pressure spring and the right pressure spring are respectively fixed at two ends of the guiding rod.

CN 201644960 discloses a self-opening die head used in an electric tube-cut wire-sleeving machine. The machine comprises a tray, a die with raised line grooves, a die tray with die grooves and a curve tray with arc raised lines and is characterized by also comprising a baffle, a locking screw, an unlocking handle, a transmission bolt pressure spring, a transmission bolt, a stopping tag and a curve locking disc with an arc adjusting groove. The curve locking disc is mounted between the tray and the curve tray which is internally provided with a locking hole. The locking screw penetrates through the locking hole and the arc adjusting groove. The die tray is provided with moon grooves. The transmission bolt pressure spring and the transmission bolt are mounted in the moon grooves. The curve locking disc is provided with a transmission hole in which the transmission bolt penetrates. The baffle is articulated on the curve locking disc which is provided with a baffle handle and a stopping lug boss. And the unlocking handle is articulated with the periphery of the die tray.

U.S. Pat. No. 2,958,877 discloses a self-opening die head comprising a skeleton or frame having a hollow elongated shank, chasers mounted on the skeleton for reciprocal movement into and out of a work-engaging position, and a chaser-operating member for moving the chasers into a work-engaging position. The combination comprises a ring shaped latch-unit positioned around the shank and having a latching portion movable transversely outwardly with respect to the longitudinal axis of the shank into a latching position with the chaser-operating member in order to releasably hold the member in its chaser-closing position. The combination also comprises a spring means resiliently urging the latch-unit into the latching position. The combination also comprises tripping means mounted within the shank of the skeleton for releasing the chaser-operating member. The tripping means has a trip member movable axially of the shank and located with one end in position for engagement with the work. The tripping means also has camming means engaging the inner surface of the latch-unit at a point diametrically opposite the latching portion and operable upon axial movement of the trip member to cam the latch-unit against the urging of the spring means and thereby move the latching portion out of the latching position. The latch-unit comprises a pair of complementary segments, a first of the segments comprising the latching portion, and the second of the segments being interlocked with the first so as to draw the first segment inwardly to an unlatching position upon actuation of the trip member.

U.S. Pat. No. 2,739,322 discloses a thread cutting die head, in which a body member is provided with a relatively fixed abutment, and an axially shiftable chaser holder closing ring is mounted on the body member and resiliently biased toward the abutment in axial alignment therewith. The closing ring has first and second annular radial surfaces offset axially and facing the abutment. A locking ring extends around the axis of the die head and is positioned between the closing ring and the abutment and has annular front and rear faces. Means are also disclosed to bodily displace the locking ring laterally of the die head between a first position to dispose the front face thereof in engagement with the first surface on the closing ring and a second position to dispose the front face thereof in engagement with the second surface of the closing ring. The rear face of the locking ring is engaged with the abutment in both positions whereby the locking ring is fixed against axial movement. The respective areas of engagement between the locking ring and the first and second surfaces and between the locking ring and the abutment are disposed at least in any three selected quadrants about the axis of the head.

Although prior art assemblies and techniques are somewhat satisfactory, a need remains for an improved mechanism and strategy for retaining a die head in a thread cutting machine.

SUMMARY

In certain embodiments according to the present subject matter, a power drive is provided for a thread cutting operation comprising a housing, a face gear disposed in the housing with a plurality of slots and at least one groove, a die head retaining mechanism, a die head disposed in the retaining mechanism, a retaining ring, and a bearing. The die head retaining mechanism includes a plurality of locking jaws, at least one compression spring, a drive ring having a plurality of cam profiles and means to compress the spring(s), a locking plate, and a plurality of clamping means.

The die head retaining mechanism is disposed between the face gear and the die head for installing or removing the die head in the power drive. Each of the locking jaw(s) is disposed in a respective slot provided on the face gear and engaged with the cam profiles of the drive ring. And at least one of the compression springs is disposed in a groove adapted to be compressed during rotation of the drive ring in order to allow the locking jaw to follow the cam profiles to move outward in a radial fashion to open or unlock the die head from the power drive.

Typically, the clamping means comprises a plurality of spring washers and screws for the assembly of the die head retaining mechanism on the face gear. A bearing is provided between the housing and the face gear and the bearing is retained by a retaining ring in a groove in the housing.

Typically, the face gear accommodates three equidistant locking jaws in three slots provided on its face oriented away from the housing. The face gear further includes at least one circumferential groove for accommodating a preloaded compression spring, wherein during a counterclockwise (e.g. anticlockwise) rotation of the drive ring, the compression spring is compressed to allow the locking jaws to follow the cam profiles of the drive ring and move outward in a radial direction to open or unlock the die head from the power drive.

Typically, the compression spring is preloaded by insertion into a groove in the face gear. During operation, the compression spring abuts one end of the groove and is constrained by the lug of the drive ring at the other end. The lug protrudes from the drive ring into a corresponding recess or slot provided on the face gear, to allow the compression spring to be compressed. And the locking jaws move outward in a radial direction to unlock the die head from the power drive.

The present subject matter and its various embodiments are generally directed to the following objectives.

It is an object of the present subject matter to provide a die head retaining mechanism for easy positive installing or removing of a die head in power drives.

It is another object of the present subject matter to provide a die head retaining mechanism facilitating an application of force on a power drive for providing die head engagement with a pipe while commencing a threading operation.

It is yet another object of the present subject matter to allow easy installation of a die head in a power drive.

It is a further object of the present subject matter to provide a die head retaining mechanism in which much less effort or force is necessary for installing and removing a die head.

Other objects and advantages of the present subject matter will be more apparent from the following description when read in conjunction with the accompanying figures, which are not intended to limit the scope of the present subject matter.

BRIEF DESCRIPTION OF THE DRAWINGS

Various die head retaining mechanisms in accordance with the present subject matter will now be explained in more detail with reference to the non-limiting accompanying drawings in which:

FIG. 2b shows a spring ring, which is located between a face gear and a die head for locking thereof, as shown in FIG. 2a.

FIG. 3 is an exploded partial assembly view showing various components of the power drive shown in FIG. 1 with a die head retaining mechanism in accordance with the present subject matter.

DETAILED DESCRIPTION OF THE EMBODIMENTS

The die head retaining mechanism in accordance with the present subject matter will now be described with reference to the accompanying drawings which do not limit the scope and ambit of the disclosure. The description provided is purely by way of examples and illustrations.

Figure 1:
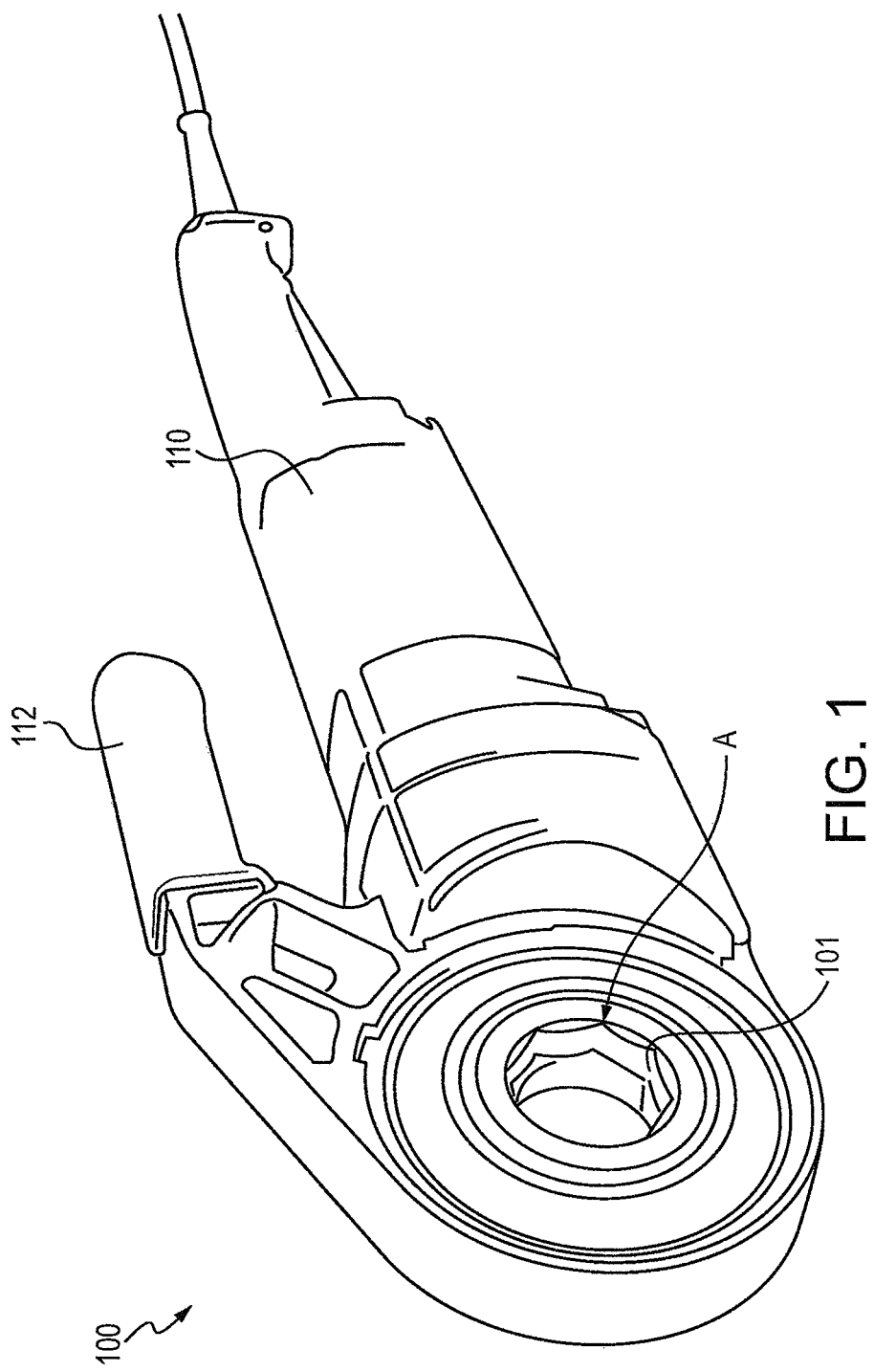
FIG. 1 shows a hand held portable power drive to provide input power to a die head during threading operations.

FIG. 1 shows a hand held portable power drive 100 typically used to provide input power to a die head 101 during threading operations. The power drive 100 typically comprises a body or housing 110, one or more handles 112, a rotary power source such as an electric motor, and associated drive components (not shown). The portable power drive 100 is typically configured for threading ⅛ inch through 2 inch die heads for threading pipes. However, it will be appreciated that the present subject matter can be applied to, or used with, power drives sized or configured for different sized die heads. The power drive 100 provides an angular velocity and torque generally dependent upon the type of thread, dies, and pipe. In such an operation, the die head needs to be retained in an axial direction to prevent disengagement with a spindle of the power drive. Particularly, a force must be applied to the die head in an axial direction shown as arrow A in FIG. 1 during the initial engagement of the die head.

Figure 2:
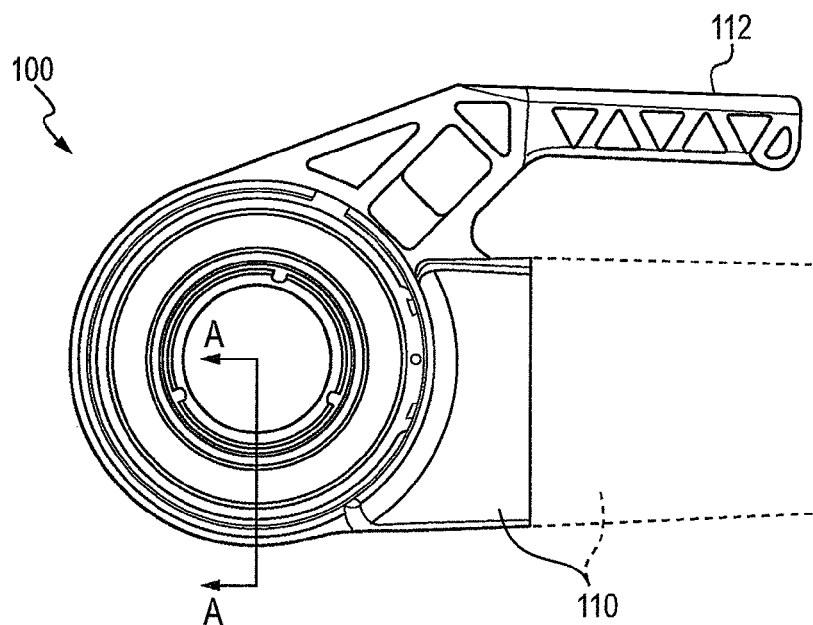
FIG. 2 is a partial cross sectional view of a power drive with a section marked with arrows A-A for describing further details.

FIG. 2 shows a portion of the power drive depicted in FIG. 1. Arrows A-A are marked therein, along which a cross sectional view is shown and described further in the following FIGS. 2a and 2b.

Figure 2A:
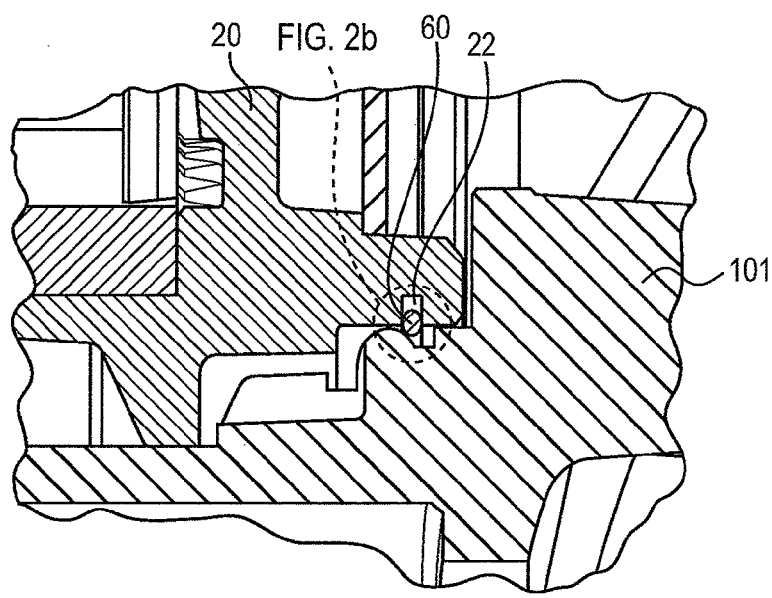
FIG. 2a shows a partial sectional view through a portion of the power drive marked with arrows A-A indicated in FIG. 2.

FIG. 2a shows a partial cross sectional view of a retaining or spring ring 60 positioned in a groove 22 defined on a face gear 20 for engaging the die head 101 in the power drive 100.

Figure 2B:
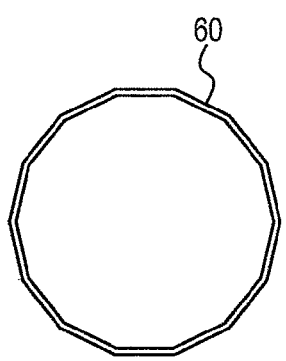

FIG. 2b shows the spring ring 60, which is snap fitted in the face gear 20 and consequently causes the locking of the die head 101 with respect to the face gear 20. As previously explained, a relatively high force is required to engage the die head 101 in the face gear 20 because the spring 60 must be compressed and urged further into the groove 22 on the face gear 20. Moreover, with continued use, the spring ring 60 loses its stiffness and thus its locking force. And so, replacement of the spring ring 60 is typically required.

FIG. 3 shows in a perspective exploded view, various components of a power drive 300 incorporating a die head retaining mechanism in accordance with the present subject matter. The power drive 300 includes a body or housing 310, one or more handles 312, a rotary power source such as an electric motor, and associated drive components (not shown). The power drive and die head retaining mechanism include a face gear 220, three retaining or locking jaws or inserts 230 disposed circumferentially equidistant on a face of the face gear 220, a bearing 240, a compression spring 250, a retaining ring 260, a drive ring 270, a locking plate 280, and spring washers 290 and screws 294 for the assembly of the power drive with the aforementioned components. The rotary or circular components are generally concentrically arranged with one another, and in particular the center of the face gear 220 is collinear with the center of the drive ring 270.

Specifically, the die head retaining assembly of the present subject matter comprises a face gear such as the face gear 220, a drive ring such as the drive ring 270, and a plurality of locking jaw inserts such as the locking jaw inserts 230. The face gear 220 defines an open interior 221, a first mating face 223, a second oppositely directed face 224, and a plurality of radially directed slots 225 on the first mating face 223. The drive ring 270 defines an open interior 271, a first mating face 273 and a second oppositely directed face 274. The first mating face 273 of the drive ring 270 is directed toward the first mating face 223 of the face gear 220. The drive ring 270 also defines a plurality of arcuate cams (not shown in FIG. 3) along the first mating face 273 of the drive ring 270. The plurality of locking jaw inserts 230 are slidably disposed between the first mating face 223 of the face gear 220 and the first mating face 273 of the drive ring 270. Each of the locking jaw inserts 230 is slidably disposed in a respective one of the plurality of radial slots 225 on the first mating face 223 of the face gear 220 and in camming engagement with a respective one of the plurality of arcuate cams along the first mating face 273 of the drive ring 270. Upon rotation of either the face gear 220 or the drive ring 270 relative to each other, each of the plurality of locking jaw inserts 230 are radially displaced.

The die head retaining assembly may also comprise a biasing member such as a spring, for example the compression spring 250, which is positioned between the first mating face 223 of the face gear 220 and the first mating face 273 of the drive ring 270. The biasing member 250 is in engagement with both of the face gear 220 and the drive ring 270 such that the biasing member 250 applies a rotational bias between the face gear 220 and the drive ring 270.

In certain embodiments, the face gear 220 defines an arcuate groove (not shown in FIG. 3) having at least one endwall along the first mating face 223 of the face gear 220. The drive ring 270 can include a lug 275 or other outwardly extending member that projects from the first mating face 273 of the drive ring 270. The biasing member 250 is typically provided in the form of a compression spring and is positioned in the arcuate groove, extending between an endwall in the face gear 220 and the lug 275 of the drive ring 270. This configuration is further described and shown.

Generally, the plurality of slots 225 on the first mating face 223 of the face gear 220 are located equidistant from one another. However, it will be appreciated that the present subject matter includes embodiments in which the slots 225 are not equidistant from one another.

Moreover, in many of the embodiments, each of the locking jaw inserts 230 includes an inwardly and radially directed extension 232. Each extension 232 is configured to engage a recess defined along an outer region of a die head (described in greater detail herein) that is to be retained by the die head retaining assembly when such assembly is incorporated in a power drive. The die head as will be understood, is typically a die head such as die head 101 used for forming threads in a pipe or other workpiece.

Figure 4A:
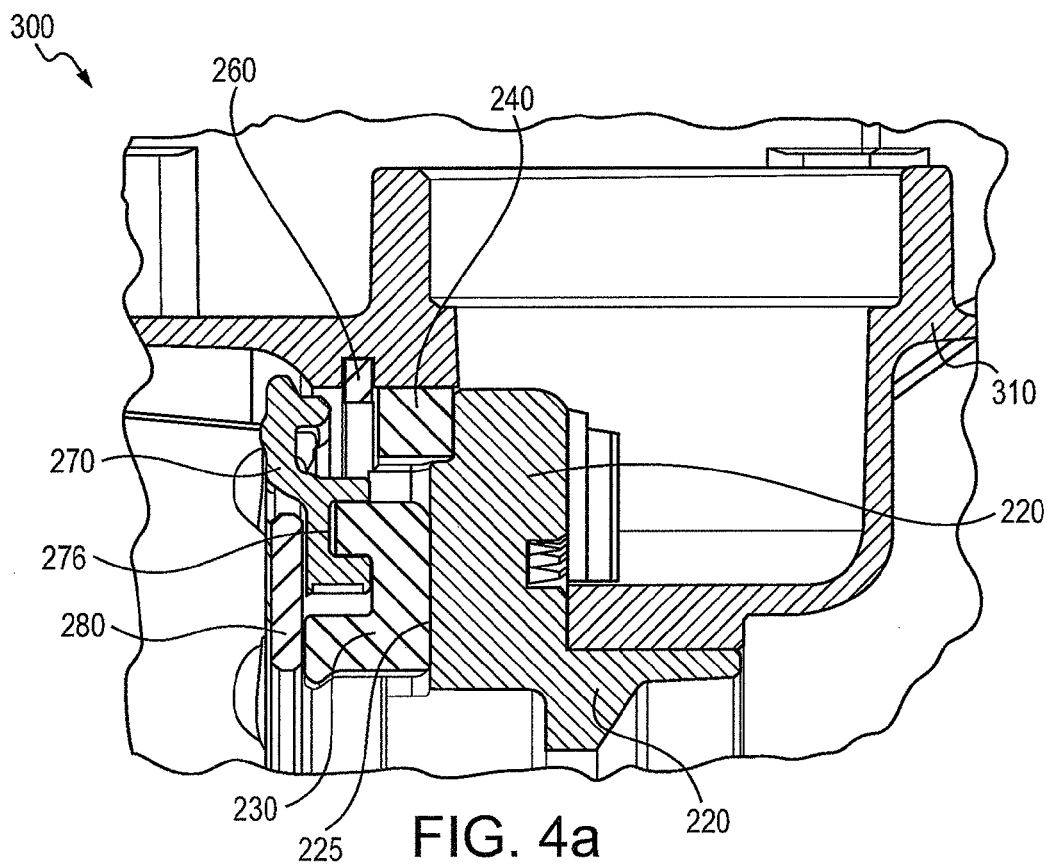
FIG. 4a shows a partial sectional assembled view of the die head retaining mechanism including a face gear and the housing of the power drive in accordance with the present subject matter.

FIG. 4a is a partial cross sectional view of the power drive 300 shown in FIG. 3 assembled with locking jaw inserts 230 positioned in the face gear 220. The face gear 220 is housed or otherwise retained in the housing 310. Three locking jaw inserts 230 are disposed circumferentially and equidistantly in the assembly. Although three locking jaw inserts 230 are shown and described, it will be understood that the present subject matter includes the use of locking jaw inserts fewer in quantity such as two, and greater in quantity such as four or more. These locking jaw inserts 230 are engaged with corresponding slots 225 in the face gear 220 and in cam grooves 276 of the drive ring 270. The number of slots 225 in the face gear 220 generally corresponds to the number of locking jaw inserts 230. Thus, if a total of three locking jaws 230 are used, then the number of slots 225 in the face gear 220 is typically three. Also shown in FIG. 4a is a bearing 240 and a retaining ring 260, described in greater detail herein. A locking plate 280 is fitted to contain the die head retaining assembly by means of spring washers 290 and screws 294 (not shown in FIG. 4a but seen in FIG. 3) threaded into or otherwise engaged with the face gear 220.

Figure 4B:
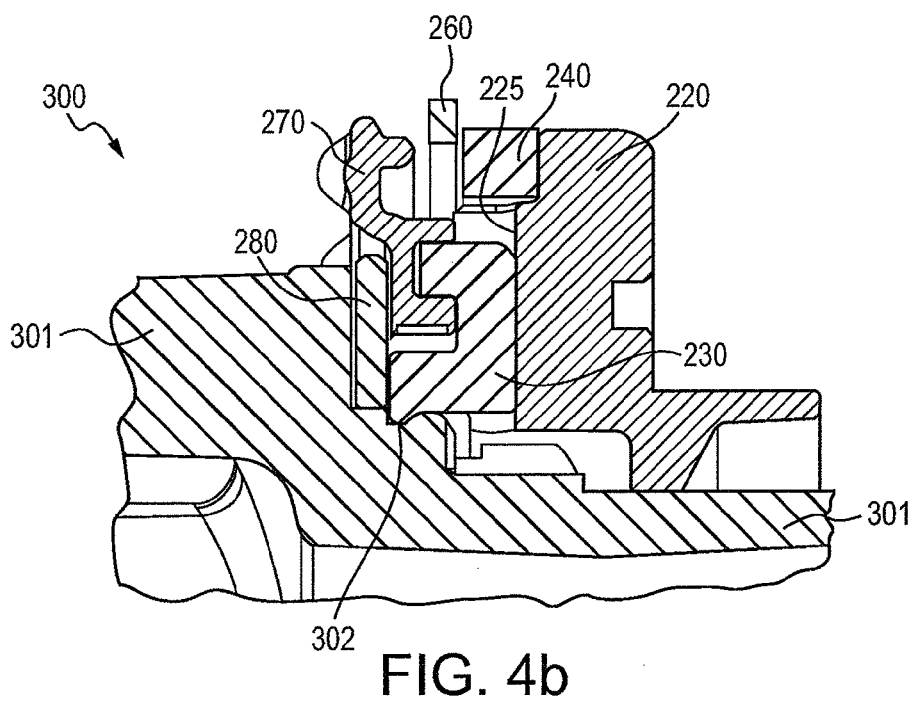
FIG. 4b shows another partial sectional view of the power drive without the housing, illustrating the face gear and a die head retained and engaged by means of the die head retaining mechanism in accordance with the present subject matter.

FIG. 4b shows an enlarged partial sectional view of the die head retaining mechanism in accordance with the present subject matter, for axial locking or unlocking the die head 301 with the power drive 300 for thread cutting operations. Here, the face gear 220 is mounted in the housing (not shown in FIG. 4b but shown in FIGS. 4a and 3) and three locking jaw inserts 230 are placed circumferentially and equidistant from each other and in slots 225 provided in the face gear 220. The jaws 230 are engaged with a groove 302 defined in the die head 301 to retain the die head 301 in the axial direction. The jaws 230 are also engaged with the cams 276 (shown and described with regard to FIG. 5b) of the drive ring 270 to allow outward radial movement of the jaws 230 upon rotation of the drive ring 270. Generally, as described in greater detail herein, rotation of the drive ring 270, such as in a counterclockwise direction, causes outward radial movement of the locking jaws 230 and thereby releases, or enables installation of, a die head such as die head 301. It will be understood that the present subject matter includes a wide range of different configurations and actuations. For example, the present subject matter also includes die head retaining assemblies in which the plurality of locking jaws such as jaw inserts 230 are moved radially inward upon clockwise rotation of the drive ring 270 relative to the face gear 220.

Figure 5A:
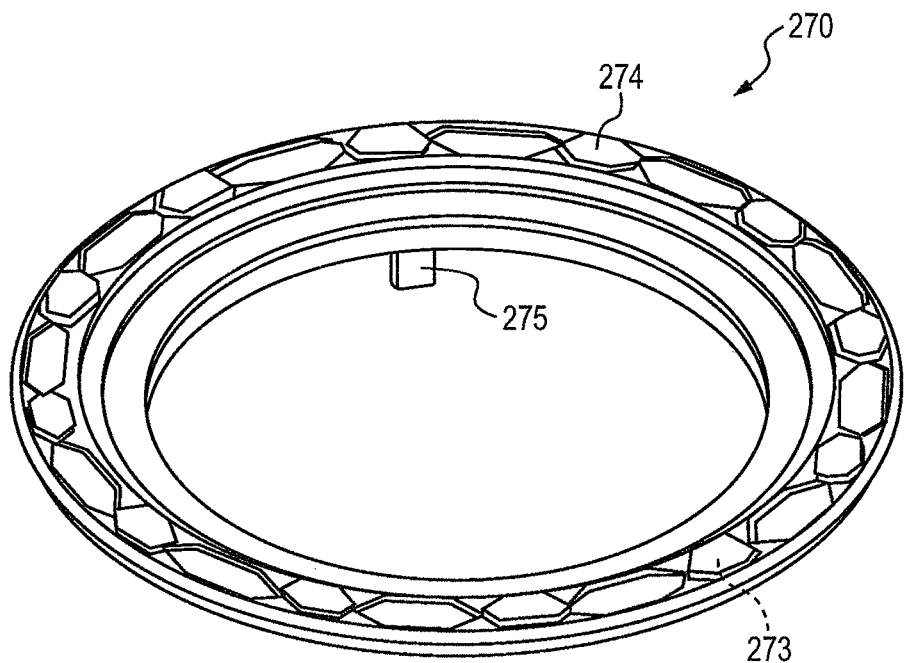
FIG. 5a shows one face of a drive ring in a perspective view, used in the die head retaining mechanism of the present subject matter.
Figure 5B:
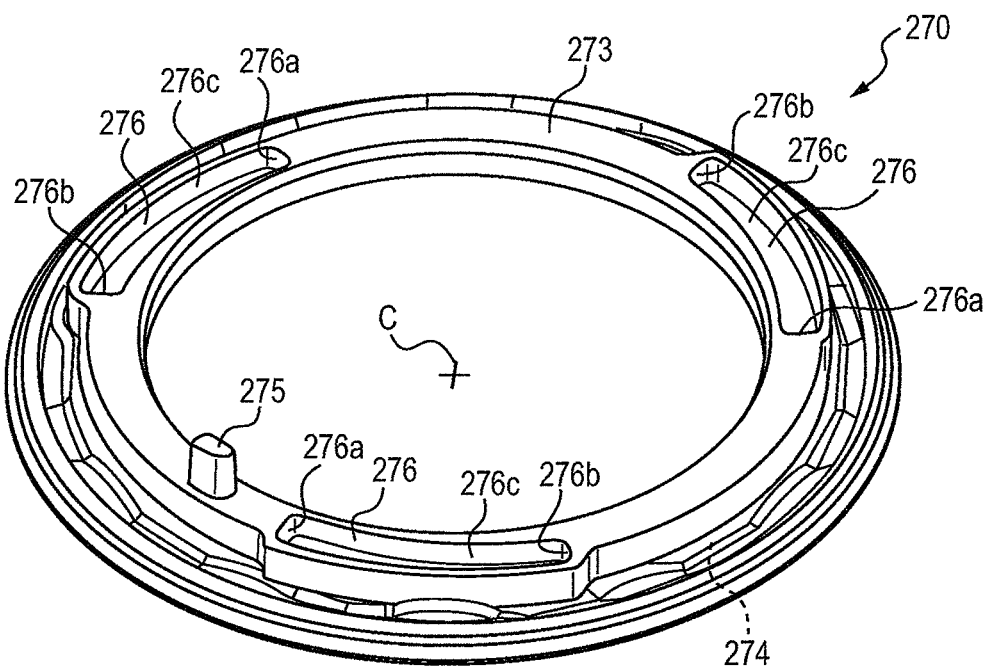
FIG. 5b shows another face of the drive ring in a perspective view, used in the die head retaining mechanism of the present subject matter.

FIG. 5a shows one face 274 of the drive ring 270 in a perspective view and FIG. 5b shows another face 273 of the drive ring 270 in a perspective view, in which the protruding lug 275 can be clearly seen. FIG. 5b illustrates a particular version of the cams 276. In this version, each cam 276 is in the form of an arcuate channel 276c or recess which is defined along the first mating face 273 of the drive ring 270. Each channel 276c extends in an arcuate or curved fashion between two opposing endwalls shown for example as 276a and 276b. Each arcuate channel 276c is oriented such that a radial distance taken from the center of the drive ring 270, shown as C in FIG. 5a, varies as that distance is taken across the length of the arcuate channel 276c. Thus, the radial distance of an arcuate channel as measured at one endwall of the channel such as endwall 276a, is different than that measurement taken at an opposite endwall such as endwall 276b.

Figure 6:
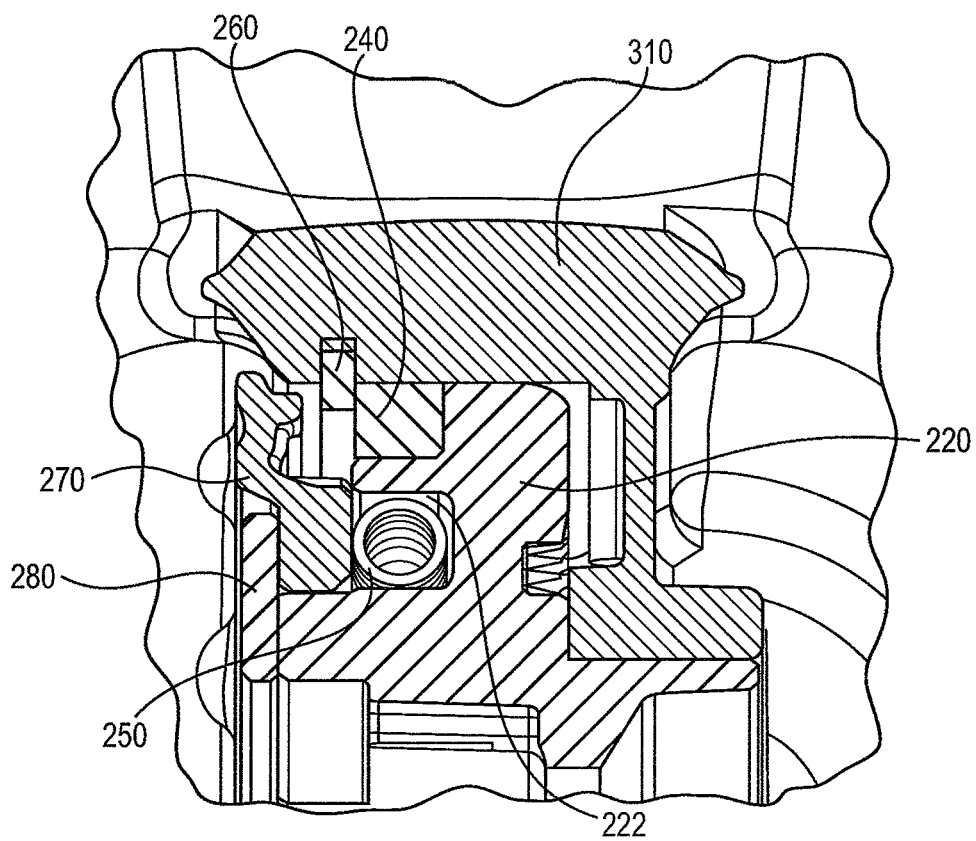
FIG. 6 shows a detailed partial sectional view of the die head retaining mechanism including the face gear and the housing of the power drive, and further showing a compression spring.

FIG. 6 shows a detailed partial sectional view of the face gear 220 in the housing 310 of the power drive 300. In particular, FIG. 6 shows a compression spring 250 inserted in an arcuate groove or pocket 222 provided on the face gear 220. Here also, the housing 310 is shown fitted with the face gear 220, a retaining or locking ring 260, a bearing 240, a drive ring 270, and finally all components are assembled together in the housing 310 by means of the locking plate 280 and spring washers 290 and screws 294 (as best shown in FIG. 3).

Figure 7:
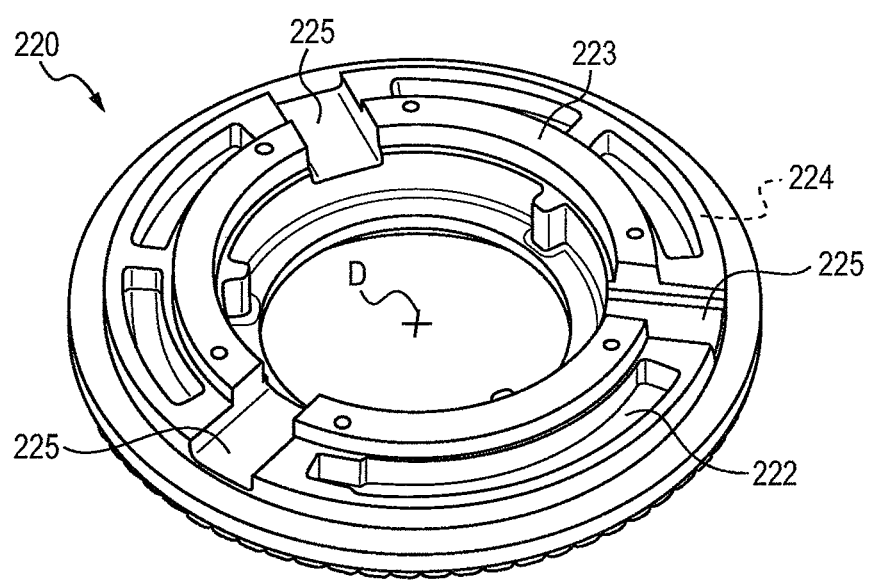
FIG. 7 shows a face gear used in the die head retaining mechanism of the present subject matter in a perspective view.

FIG. 7 shows a face gear 220 in a perspective view. The face gear defines a first mating face 223 and a second oppositely directed face 224. The face gear 220 is also shown in FIG. 3 and includes three slots 225 and the arcuate groove 222 for accommodating the compression spring 250 (not shown in FIG. 7 but shown in FIGS. 3 and 5). Specifically, the slots 225 are radially oriented. That means that a centerline of each slot is directed toward the center of the face gear, or substantially so. The center of the face gear 220 is shown in FIG. 7 as D.

Figure 8A:
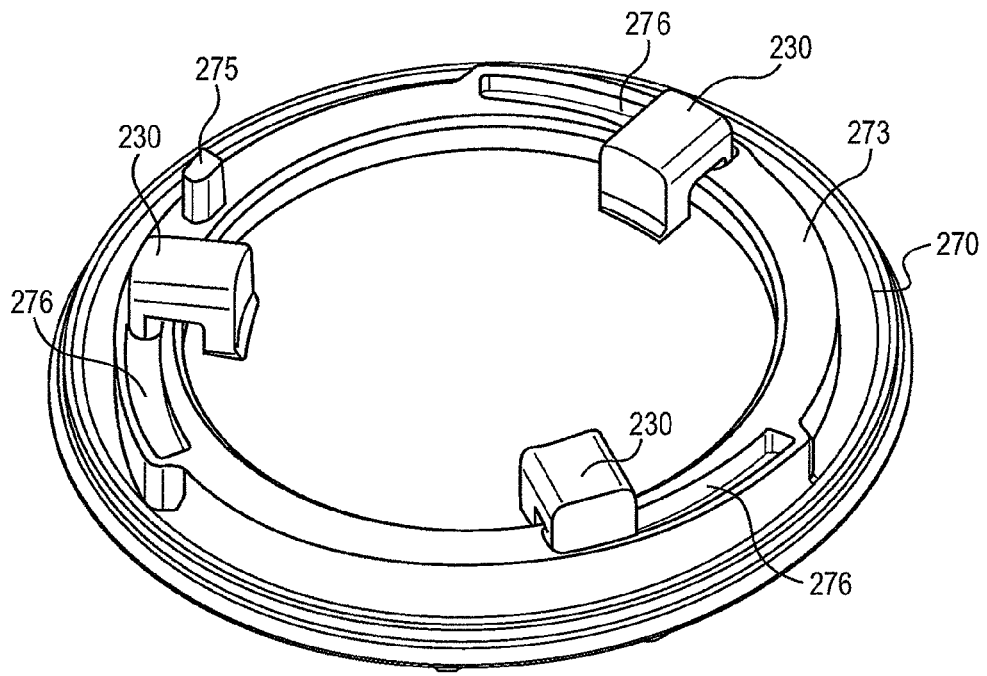
FIG. 8a shows a perspective view of the drive ring assembled with three retaining/locking jaws in accordance with the present subject matter.

FIG. 8a shows a perspective view of the drive ring 270 assembled with three retaining locking jaw inserts 230, which are engaged in their respective cams 276, in accordance with the present subject matter. As will be understood, as the drive ring 270 is rotated relative to the locking jaws 230, each locking jaw 230 is displaced along a length portion of a corresponding cam 276. As a result of the orientation of each cam 276, the locking jaws 230 are also radially displaced. That is, upon movement along a length of the cams 276, the locking jaws 230 are displaced radially inward, i.e. toward the center of the drive ring 270; or radially outward, i.e. away from the center of the drive ring 270. FIG. 8a also illustrates a lug 275 extending from the first mating face 273 of the drive ring 270.

Figure 8B:
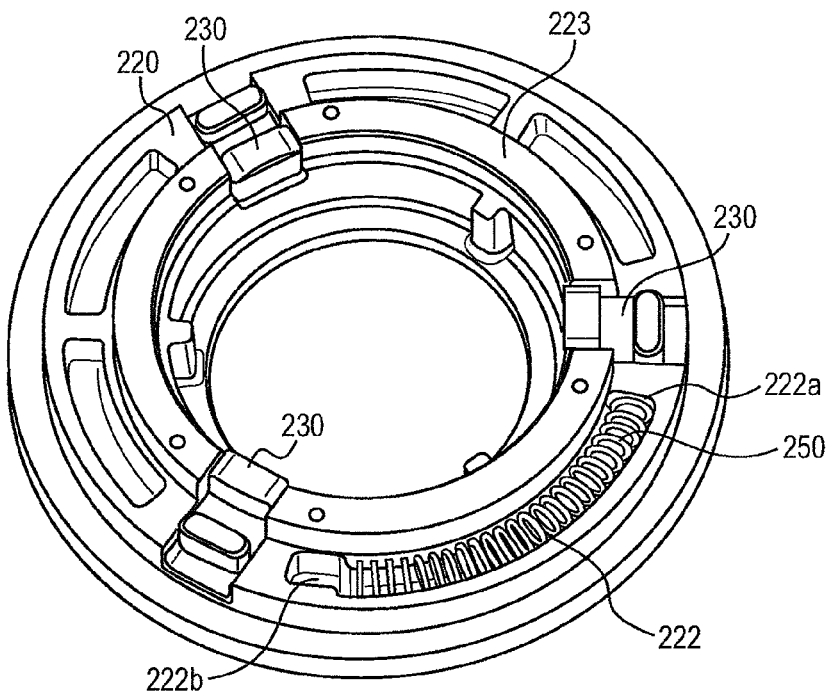
FIG. 8b shows a perspective view of the face gear assembled with three retaining/locking jaws, and a compression spring in accordance with the present subject matter.

FIG. 8b shows a perspective view of the face gear 220 assembled with three retaining locking jaw inserts 230 in accordance with the present subject matter. In the normal position of the drive ring (not shown), locking jaws 230 are in a locked position in which they are extended radially inward. During a counterclockwise (or an anticlockwise) rotation of the drive ring, the lug 275 (not shown in FIG. 8b, but illustrated in FIG. 8a) engages the spring 250 and compresses the spring 250. Simultaneously, the locking jaws 230 follow the cam profile 276 provided on the drive ring 270, thus moving outward in the radial direction in order to disengage the jaws 230 from the die head. The compression spring 250 is disposed within the arcuate groove 222 defined along the first mating face 223 of the face gear 220. One end of the compression spring 250 is engaged with an endwall 222a of the face gear groove 222 and the other end of the spring 250 is engaged with the protruded portion or lug 275 of the drive gear 270. As will be understood, upon assembly and mating of the face gear 220 and the drive ring 270, the lug 275 of the drive ring 270 extends through an aperture 222b defined in the arcuate groove 222, and particularly along an end region of the groove opposite the endwall 222a. Without counterclockwise rotation of the drive ring 270, the compression spring 250 always urges or presses the drive ring lug 275 into the arcuate groove 222 and in the aperture 222b to keep the locking jaws 230 in engagement with the die head 301. As shown in FIG. 3, after the assembly of the face gear 220 with the housing 310, the compression spring 250, the locking jaws 230 and the drive ring 270 are assembled. Thereafter, the complete assembly is locked by the locking plate 280 by use of the spring washers 290 and tightening of the screws 294. In particular, a gripping area described and shown in FIGS. 9a and 9b and the provision of an outer textured surface is provided on the drive ring 270 in such a manner that in any orientation, a finger or hand can easily access and an easy grip can be made for rotation thereof.

Figure 9A:
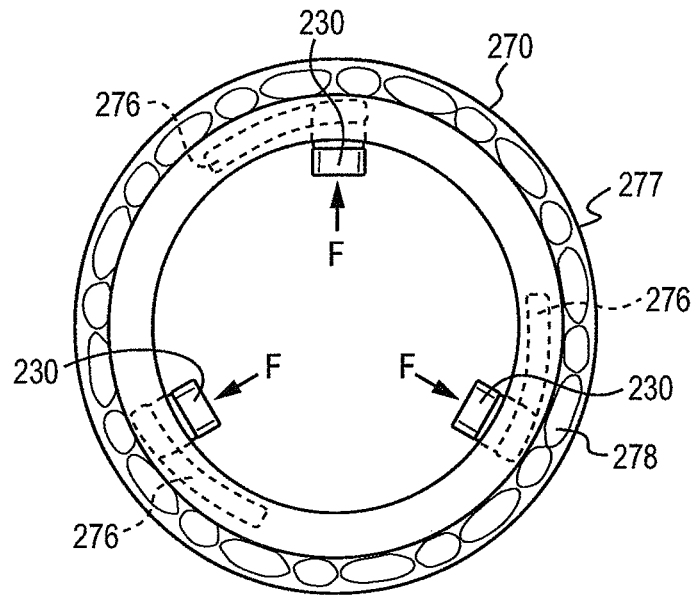
FIG. 9a and FIG. 9b illustrate operation of the die head retaining mechanism in accordance with the present subject matter.
Figure 9B:
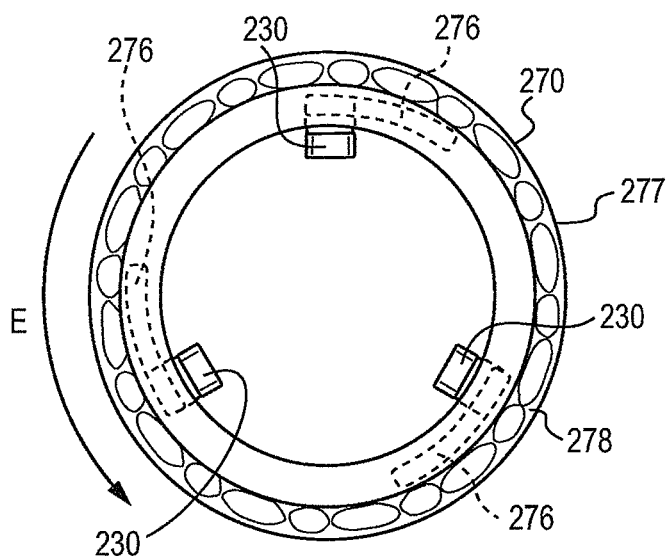

FIG. 9a and FIG. 9b show that by a counterclockwise rotation in the direction of arrow E of the drive ring 270, the locking jaws 230 are urged to follow the cam profile 276 provided on the drive ring 270. The locking jaws 230 thus move outward in the radial direction in the direction of arrows F. And the jaws 230 are thereby disengaged from the die head (not shown). As previously explained, it will be understood that the present subject matter includes different orientations and actuations. For example, the components could be configured such that upon a counterclockwise rotation of the drive ring, the locking jaws are displaced radially inward. Referring further to FIGS. 9a and 9b, one or more regions or portions of the outer surface of the drive ring 270 such as circumferential surface(s) 277 can be used as gripping areas by a user when rotating the drive ring 270. Furthermore, one or more regions or portions of the drive ring 270 may be textured, roughened, and/or include raised regions or recessed regions, e.g. peaks and pits, to promote gripping by a user. These regions or portions are collectively depicted as 278 in FIGS. 9a and 9b. Gripping areas which include peaks and pits may be provided along circumferential edge regions of the drive ring 270.

The technical advantages obtained with the die head retaining mechanism in accordance with the present subject matter include the following. The effort and time required for the engagement and disengagement of the die head is less. A positive locking of the die head in the power drive is achieved. The die head retaining mechanism facilitates application of force on the power drive for providing die head engagement with a pipe while commencing the threading operation. The die head retaining mechanism also promotes ease of use for assembly of the die head. The present subject matter mechanism can be used in all types of machines where axial locking of a die head is required.

Throughout this specification the word "comprise," or variations such as "comprises" or "comprising," will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the present subject matter to achieve one or more of the desired objects or results.

Any discussion of documents, acts, materials, devices, articles or the like that has been included in this specification is solely for the purpose of providing a context for the present subject matter. It is not to be taken as an admission that any or all of these matters form part of the prior art base or were common general knowledge in the field relevant to the subject matter as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The die head retaining mechanism in accordance with the present subject matter herein and the various features and advantageous details thereof are explained with reference to the non-limiting embodiments in the previous description. Descriptions of well known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

All patents, applications, and articles noted herein are hereby incorporated by reference in their entirety.

The description herein, of the specific embodiments of the die head retaining mechanism will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A power drive for performing thread cutting operations, the power drive comprising:
    a housing;
    a face gear disposed in the housing with a plurality of slots and at least one groove;
    a die head retaining mechanism, the die head retaining mechanism comprising:
        at least one locking jaw including an inwardly and radially directed extension;
        at least one compression spring;
        a drive ring having a plurality of cam profiles and means to compress the spring(s);
    a die head disposed in the die head retaining mechanism, the die head defining a recessed groove;
    wherein the die head retaining mechanism is disposed between the face gear and the die head for installing or removing the die head in the power drive, each of the at least one locking jaws is disposed in a respective slot provided on the face gear and engaged with at least one of the cam profiles of the drive ring, and the at least one compression spring is disposed in the at least one groove in the face gear and adapted to be compressed during rotation of the drive ring to allow the locking jaws to follow the cam profiles to move outward in a radial fashion to open or unlock the die head from the power drive, and the extension of each locking jaw disposed in the groove of the die head to thereby retain the die head.

2. The power drive of claim 1 further comprising a locking plate and a plurality of clamping means for engagement to the drive ring.

3. The power drive of claim 2, wherein the clamping means comprise a plurality of spring washers and screws for engaging the die head retaining mechanism on the face gear.

4. The power drive of claim 1 further comprising a bearing and a retaining ring, wherein the bearing is disposed between the housing and the face gear and the bearing is retained by the retaining ring in a groove in the housing.

5. The power drive of claim 1, wherein the face gear accommodates three equidistant locking jaws in three slots provided on a face of the face gear oriented away from the housing, the face gear further including at least one circumferential groove for accommodating a preloaded compression spring, wherein during an anticlockwise rotation of the drive ring, the compression spring is compressed to allow the locking jaws to follow the cam profiles of the drive ring and move outward in a radial direction to open or unlock the die head from the power drive.

6. The power drive of claim 1, wherein the compression spring is preloaded by insertion into the at least one groove in the face gear and during operation, the compression spring abuts one end in the groove and is constrained by a lug of the drive ring at the other end; the lug protrudes from the drive ring into a corresponding recess or slot provided on the face gear, to allow the compression spring to be compressed, and the locking jaws to move outward in a radial direction, and unlock the die head from the power drive.

7. The power drive of claim 1, wherein a lug protrudes from the drive ring and engages one end of the compression spring to compress the compression spring and the other end of the compression spring is engaged in a groove provided on the face gear, in order for the at least one locking jaw to move outward in a radial direction to disengage the at least one locking jaw from the die head.

8. The power drive of claim 1 wherein the drive ring is provided with a gripping area defined with circumferentially defined pits and peaks for gripping the drive ring in any orientation for rotation thereof.

* * * * *